United States Patent [19]

Klepeis

[11] 4,450,145

[45] May 22, 1984

[54] PROCESS FOR THE REMOVAL OF SO$_2$ FROM GAS STREAMS

[75] Inventor: John E. Klepeis, New Fairfield, Conn.

[73] Assignee: Stauffer Chemical Company, Westport, Conn.

[21] Appl. No.: 437,044

[22] Filed: Oct. 27, 1982

[51] Int. Cl.$^3$ .................. C01B 17/00; B01D 19/00
[52] U.S. Cl. ................. 423/242; 423/574 R; 423/574 L; 55/73
[58] Field of Search .......... 423/242 A, 242 R, 244 A, 423/244 R, 243, 574 L, 574 R; 55/73

[56] References Cited

U.S. PATENT DOCUMENTS

| | | | |
|---|---|---|---|
| 2,563,437 | 8/1951 | Townsend et al. | 23/225 |
| 3,047,364 | 7/1962 | Vian-Ortuno | 23/178 |
| 3,911,093 | 10/1975 | Sherif et al. | 423/574 |
| 3,969,492 | 7/1976 | Witte et al. | 423/574 |
| 4,123,507 | 10/1978 | Haas | 423/573 G |

OTHER PUBLICATIONS

Chang et al., "SO$_2$ Absorption Into Aqueous Solutions", AIChE Journal, vol. 27, No. 2, pp. 292–298, Mar. 1981.
Pfeiffer, Sulfur Removal and Recovery From Industrial Process, Amer. Chemical Society, pp. 194–195, 1975.

Primary Examiner—Gregory A. Heller
Attorney, Agent, or Firm—Richard P. Fennelly

[57] ABSTRACT

The removal of SO$_2$ from two or more gas streams of differing SO$_2$ content is accomplished by feeding each of the streams to an absorbent so that the more dilute SO$_2$-containing stream or streams is supplied to the absorbent upstream from the point at which the more concentrated stream or streams is supplied. By supplying the gas streams to the absorbent flow in ascending order of SO$_2$ concentration, the amount of SO$_2$ absorbed by the absorbent flow is increased.

18 Claims, 2 Drawing Figures

PROCESS FOR THE REMOVAL OF $SO_2$ FROM GAS STREAMS

BACKGROUND OF THE INVENTION

1. Field of the Invention

The present invention relates to a process for the removal of $SO_2$ from two or more gas streams.

2. Description of the Prior Art

It is known to remove $SO_2$ gas from a gas stream by absorbing the $SO_2$ in a suitable absorbent. Examples of some prior art patents showing such a technique are: U.S. Pat. Nos. 2,563,437 and 3,047,364.

In certain situations, two or more gas streams containing differing $SO_2$ levels will require treatment to remove the $SO_2$ from each stream. It has been commonplace to combine such gas streams into a single stream prior to contact with the absorbent. In order to recover the $SO_2$ values from such a resulting stream, large quantities of absorbent solution must be circulated due to the limitations of $SO_2$ equilibrium solubility. Hence, a need exists for a more efficient way to absorb $SO_2$ from two or more gas streams which contain varying $SO_2$ levels.

In U.S. Pat. No. 4,123,507 to R. H. Hass two $SO_2$ streams, presumably of differing $SO_2$ content, are not combined and are supplied to an absorber at two differing points. This patent, however, fails to indicate the degree of difference of the $SO_2$ content of the streams, fails to indicate which stream is the more concentrated, and fails to indicate any advantage for not combining the gas streams into a single stream prior to contact with the absorber. The patent illustrates recirculation of $SO_2$-rich absorbent through the absorber which would tend to equalize the concentration of $SO_2$ gas in the absorber.

SUMMARY OF THE PRESENT INVENTION

The present invention is a process for the removal of $SO_2$ from two or more gas streams each having a differing $SO_2$ content. The process comprises providing a flow of liquid absorbent for the $SO_2$-containing gas streams through at least one absorbent zone and supplying the gas streams to the absorbent flow in ascending order of $SO_2$ concentration so that the streams are supplied to the flow such that the more $SO_2$ dilute gas stream, or streams, is supplied to the flow upstream from the more $SO_2$-concentrated gas stream, or streams, in order to increase the amount of $SO_2$ absorbed in the absorbent zone, or zones, by the absorbent flow.

In the present process, advantage is taken of the equilibrium solubility of $SO_2$ to minimize absorbent circulation and thus minimize capital and operating costs. By supplying the more concentrated $SO_2$ stream, or streams, to the absorbent flow without being diluted by the more dilute $SO_2$ stream while also contacting the more dilute $SO_2$ stream with the more lean absorbent, higher $SO_2$ loadings are achieved for the present process.

DESCRIPTION OF THE DRAWINGS

The Drawings, which form a part of the present specification, illustrate certain embodiments of the present invention wherein.

DESCRIPTION OF THE PREFERRED EMBODIMENTS

Figure 1:
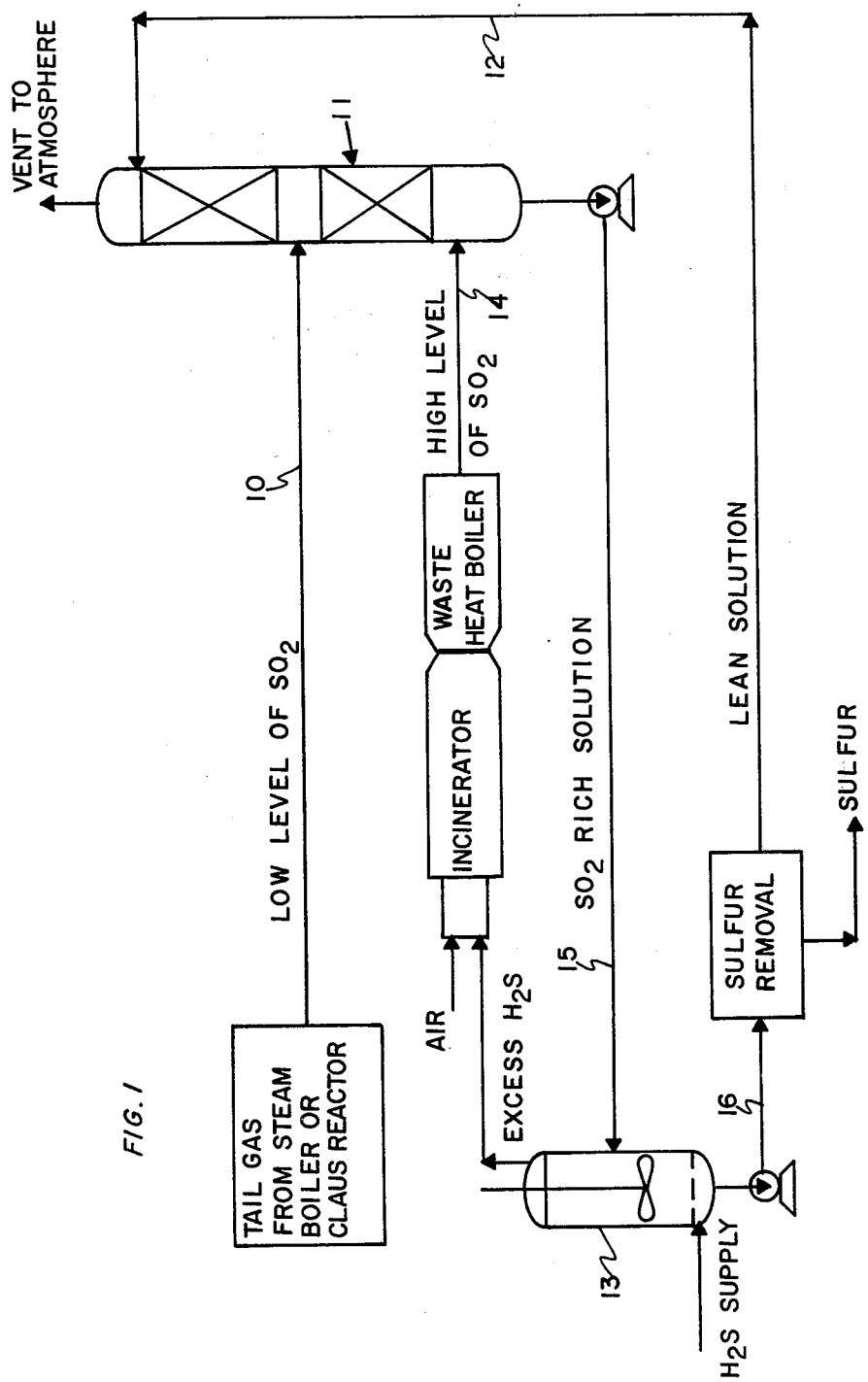
FIG. 1 is a schematic view of one embodiment of the present invention utilizing a single absorption column.

One embodiment of the present invention is illustrated in FIG. 1 wherein the process is used to remove $SO_2$ from a tail gas source containing a relatively low (e.g., less than 2 vol. %) $SO_2$ content and from a second, somewhat higher (e.g., over 2 vol. %) $SO_2$-containing source from the incineration of excess $H_2S$ from a Claus reactor, e.g., an aqueous phase Claus reactor.

The tail gas source can be a Claus plant incinerator, steam boiler, or the like, with the $SO_2$-containing gas being fed via line 10 to an intermediate portion of absorber 11. Lean absorbent solution is fed to the top of the absorber via line 12 and can be any $SO_2$ absorbent known to persons of ordinary skill in the art. Exemplary absorbents include alkali metal phosphate buffered or unbuffered aqueous solutions, alkali metal citrate buffered or unbuffered aqueous solutions, and the like.

The second, more concentrated $SO_2$ source results from the incineration of excess $H_2S$ from an aqueous regeneration/aqueous phase Claus reactor 13. This incinerated $SO_2$ is fed via line 14 to a point in the bottom portion of absorber 11 which is downstream from the lower concentration $SO_2$ stream fed via line 10.

The absorbent, which becomes enriched in $SO_2$, is removed from absorber 11 by means of line 15 and is sent to the Claus reactor 13 where the $SO_2$ contained in the absorbent reacts with a supply of $H_2S$ forming sulfur in accordance with the classical Claus reaction carried out in an aqueous phase which is sent via line 16 to sulfur removal apparatus. The lean absorbent solution is then recycled to the absorber 11 by line 12.

Figure 2:
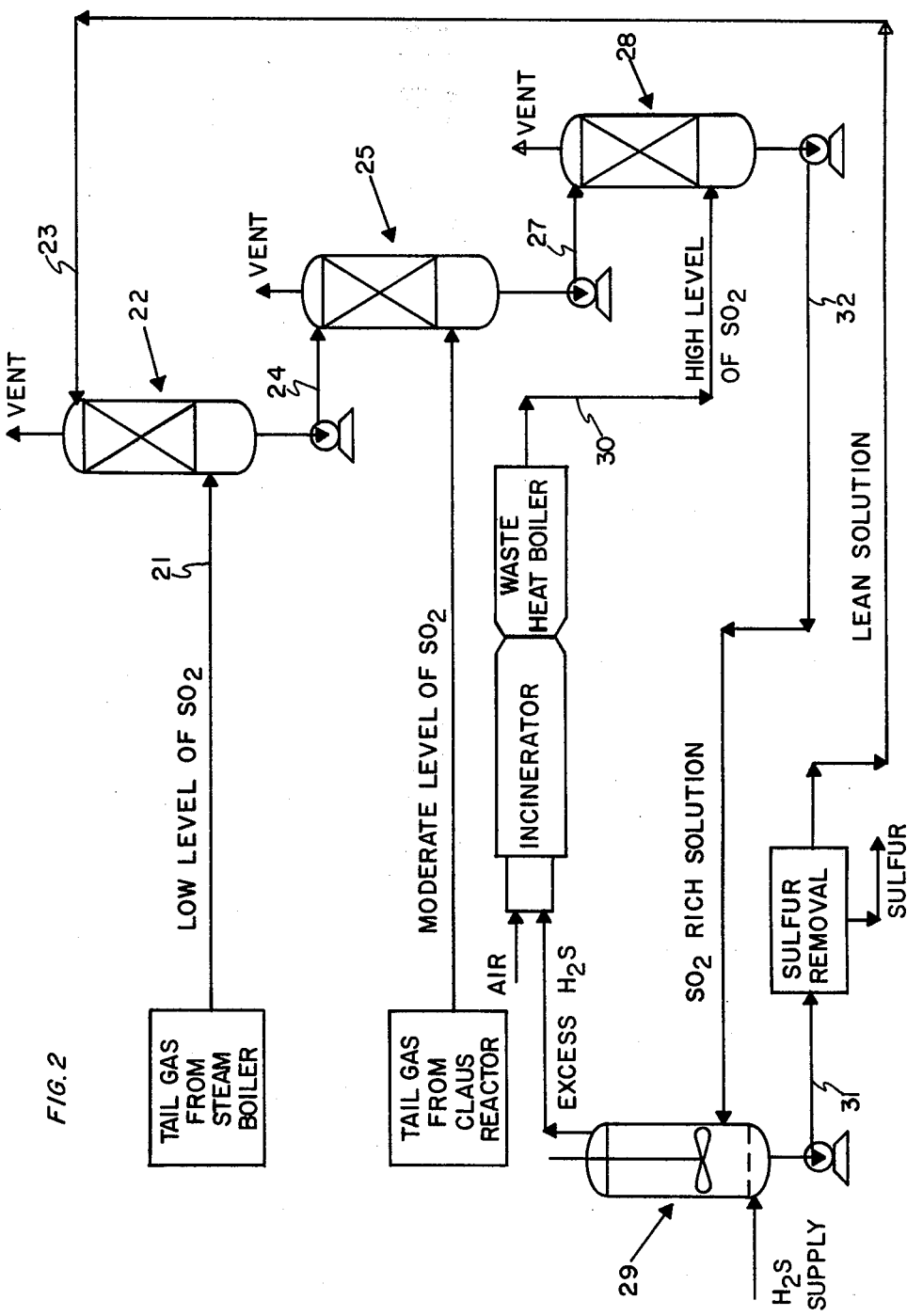
FIG. 2 is another embodiment of the present invention showing use of a series of absorption columns.

FIG. 2 illustrates another embodiment of the present invention in which three streams of varying $SO_2$ content are each treated in three absorbers connected in series.

The stream 21 is lowest in $SO_2$ content (e.g., from the tail gas of a steam boiler) and is fed to absorber 22 with absorbent being supplied via line 23. The absorbent containing absorbed $SO_2$ is then fed via line 24 to second absorber 25. A second stream 26, somewhat more concentrated in $SO_2$ content (e.g., the incinerated tail gas from a Claus reactor), is fed to absorber 25 with the absorbent containing additionally absorbed $SO_2$ fed via line 27 to absorber 28. The highest $SO_2$-containing stream (e.g., from incineration of excess $H_2S$ from an aqueous Claus reactor 29) is fed via line 30 to the third absorber 28 which is downstream from absorbers 22 and 25.

Absorbent effluent from absorber 28 is relatively rich in absorbed $SO_2$ and is fed to absorbent/regeneration reactor 29 for combination with $H_2S$. The resulting Claus reaction yields a liquid stream at 31 which is passed to appropriate sulfur removal apparatus with the lean absorbent solution being recycled via lines 32 and 23 to the first absorber 22 for contact with the most dilute $SO_2$-containing stream 21.

Depending upon the amount of $SO_2$ removal required, the gaseous effluents from each absorber can either be vented as shown in FIG. 2 or can be further treated by feeding them into the next absorber (e.g., the gaseous vent on absorber 28 can be fed to absorber 25 for further treatment or the gaseous vent on absorber 25 can be fed to absorber 22 for further treatment).

The process of the present invention, by insuring that the gas streams are supplied to the lean absorbent in ascending order of $SO_2$ concentrations, results in higher $SO_2$ equilibrium concentrations in the absorbent thereby allowing for a concomitant reduction in the absorbent solution circulation rate.

The process conditions used to absorb $SO_2$ in the present process are the conventional conditions well known to persons of ordinary skill in the art. Generally speaking, the absorption can take place at temperatures ranging from about 35° C. to about 80° C. with the pH of the absorbent preferably in the range of from about 2 to 6.5. Similarly, the Claus reaction, and incineration and sulfur removal steps illustrated in connection with the present invention are in accordance with conventional practice.

The following Examples illustrate the equilibrium solubility characteristics of $SO_2$ under various conditions.

EXAMPLE 1

A series of experiments were conducted in absorbing $SO_2$ gas into a phosphate absorbent of the type described in U.S. Pat. No. 3,911,093 to F. G. Sherif et al. The loading values were obtained by circulating the absorbent solution at a fixed temperature and at a constant $SO_2$ gas inlet composition until the $SO_2$ gas content in and out of the absorbent zone was the same. The gas was saturated with water at the column operating temperature in order to maintain the water balance. Listed below were the results obtained at 74° C.±1° C. using an absorbent having the following characteristics: $SO_4$: 57.5 gm/l.; 1.57M Na; 1.0M P; 0.26 gm/l. $S_xO_6$; pH: 4.4±0.2; and $SO_2O_3$: about 11.5 gm./l.

| Sample No. | $SO_2$ in Gas (%) | $SO_2$ Loading (gm/l.) | $S_2O_3$ (gm/l.) | pH at Equilibrium |
|---|---|---|---|---|
| 1 | 2.0 | 5.50 | 13.4 | 3.22 |
| 2 | 1.66 | 5.53 | 11.1 | 3.07 |
| 3 | 1.38 | 4.86 | 11.2 | 3.18 |
| 4 | 1.16 | 4.41 | 11.2 | 3.18 |
| 5 | 0.82 | 3.77 | 12.9 | 3.28 |
| 6 | 0.61 | 3.20 | 13.4 | 3.40 |
| 7 | 0.32 | 2.56 | 13.4 | 3.50 |
| 8 | 0.25 | 2.11 | 10.8 | 3.80 |
| 9 | 0.15 | 1.31 | 10.8 | 3.84 |
| 10 | 0.10 | 1.28 | 11.2 | 3.86 |
| 11 | 0.05 | 0.96 | 11.2 | 4.00 |
| 12 | 0.04 | 0.57 | 11.2 | 4.12 |
| 13 | 0.03 | 0.57 | 11.1 | 4.17 |
| 14 | 0.02 | 0.38 | 11.6 | 4.18 |
| 15 | 0.01 | 0.24 | 11.2 | 4.12 |

These data illustrate the general trend that the solubility of $SO_2$ in aqueous solutions is increased as the percent $SO_2$ in the inlet gas is increased.

EXAMPLE 2

The data presented below illustrate the $SO_2$ loading values in the phosphate absorbent used in Example 1 for relatively dilute $SO_2$-containing gas streams at two differing temperatures:

| Sample No. | Temp. (°C.) | $SO_2$ in Gas (%) | $SO_2$ Loading (gm/l.) | $S_2O_3$ (gm/l.) |
|---|---|---|---|---|
| 1 | 53 | 0.011 | 0.84 | 12.32 |
| 2 | 53 | 0.035 | 1.52 | 12.28 |
| 3 | 53 | 0.070 | 2.06 | 11.64 |
| 4 | 74 | 0.011 | 0.23 | 14.10 |
| 5 | 74 | 0.035 | 0.91 | 11.64 |
| 6 | 74 | 0.072 | 1.30 | 12.50 |

These data show that the $SO_2$ loading increases with increasing $SO_2$ content in the inlet gas and is also increased by use of lower temperatures.

EXAMPLE 3

The data presented below illustrate the $SO_2$ loading characteristics for gas streams containing a higher $SO_2$ content than the streams tested in Example 2:

| Sample No. | Temp. (°C.) | $SO_2$ in Gas (%) | $SO_2$ Loading (gm/l.) | $SO_2O_3$ (gm/l.) |
|---|---|---|---|---|
| 1 | 53 | 5.5 | 9.4 | 11.40 |
| 2 | 53 | 10.5 | 11.3 | 11.20 |
| 3 | 74 | 5.5 | 6.7 | 11.60 |
| 4 | 74 | 10.5 | 8.2 | 11.20 |

The same general trends noted for Example 2 also pertain.

EXAMPLE 4

Listed below are the $SO_2$ loading data using a somewhat higher temperature (i.e., 80° C.±1° C.) than used in any of Examples 1-3:

| Sample No. | $SO_2$ in Gas (%) | $SO_2$ Loading (gm/l.) | $S_2O_3$ (gm/l.) |
|---|---|---|---|
| 1 | 1.64 | 5.03 | 11.60 |
| 2 | 1.12 | 4.84 | 11.82 |
| 3 | 0.62 | 3.77 | 11.82 |
| 4 | 0.225 | 2.32 | 12.28 |

The increased $SO_2$ content in the gas results in an increased $SO_2$ loading.

EXAMPLE 5

This shows the $SO_2$ loading values at 53° C.±1° C. for relatively low $PO_4^{-3}$ concentration absorbents ($S_2O_3^{-2}$: 11.7±0.4 gm./l. at P=1.0±0.2M and $S_2O_3^{-2}$: 6.2±0.1 gm./l. at P=0.53±0.1M):

| % $SO_2$ in Gas | | $SO_2$ Loading (gm./l.) | |
|---|---|---|---|
| P = 1.0 | P = 0.53 | P = 1.0 | P = 0.53 |
| 1.54 | 1.54 | 8.1 | 5.5 |
| 1.36 | 1.34 | 7.7 | 5.7 |
| 1.12 | 1.12 | 7.4 | 5.4 |
| 0.90 | 0.82 | 6.7 | 4.6 |
| 0.62 | 0.62 | 5.7 | 4.0 |
| 0.375 | 0.375 | 4.7 | 3.4 |
| — | 0.275 | — | 2.7 |
| 0.140 | 0.140 | 3.2 | 2.1 |

These data also illustrate the general trend that an increased $SO_2$ content in the inlet gas produces an increased $SO_2$ loading in the absorbent with a greater loading occurring as the phosphate concentration is increased for the relatively dilute $PO_4^{-3}$ solutions used.

The foregoing Examples should not be construed in a limiting sense. The scope of protection desired is set forth in the claims which follow.

What is claimed:

1. A process for the removal of $SO_2$ from two or more gas streams each having a differing $SO_2$ content which comprises:
   (a) providing a flow of lean liquid absorbent for the $SO_2$ through at least one absorbent zone; and
   (b) supplying the gas streams containing the $SO_2$ to the absorbent flow so that the gas streams are supplied to the flow in ascending order of $SO_2$ concentration such that each more dilute $SO_2$-containing stream is supplied to the flow upstream from each more concentrated $SO_2$-containing stream in order to increase the amount of $SO_2$ absorbed by the absorbent flow.

2. A process as claimed in claim 1 wherein a single absorber is used.

3. A process as claimed in claim 1 wherein a plurality of absorbers is used, each connected in series to one another.

4. A process as claimed in claim 3 wherein each absorber treats a single gas stream.

5. A process as claimed in claim 1 wherein the most concentrated $SO_2$ gas stream is from the incineration of excess $H_2S$ from an aqueous phase Claus reactor.

6. A process as claimed in claim 1 wherein the absorbent from the last absorbent zone is passed to an aqueous phase Claus reactor for reaction of the $SO_2$ contained therein with $H_2S$.

7. A process as claimed in claim 1 wherein the absorbent from the last absorbent zone is passed to an aqueous phase Claus reactor for reaction of the $SO_2$ contained therein with $H_2S$ with recycle of the resulting lean absorbent to the absorbent zone used to treat the most dilute $SO_2$-containing gas stream.

8. A process as claimed in claim 2 wherein absorbent from the last absorbent zone is passed to an aqueous phase Claus reactor for reaction of the $SO_2$ contained therein with $H_2S$ with recycle of the resulting lean absorbent to the absorbent zone used to treat the most dilute $SO_2$-containing gas stream.

9. A process as claimed in claim 3 wherein absorbent from the last absorbent zone is passed to an aqueous phase Claus reactor for reaction of the $SO_2$ contained therein with $H_2S$ with recycle of the resulting lean absorbent to the absorbent zone used to treat the most dilute $SO_2$-containing gas stream.

10. A process as claimed in claim 1 wherein a single absorber is used with the most concentrated $SO_2$ gas stream being from the incineration of excess $H_2S$ from a Claus reactor.

11. A process as claimed in claim 10 wherein the absorbent from the last absorbent zone in the absorber is passed to an aqueous phase Claus reactor for reaction of the $SO_2$ contained therein with $H_2S$.

12. A process as claimed in claim 11 wherein lean absorbent from the Claus reactor is recycled to the absorbent zone used to treat the most dilute $SO_2$-containing gas stream.

13. A process as claimed in claim 1 wherein a plurality of absorbers is used, each connected in series to one another, with the most concentrated $SO_2$ gas stream being from the incineration of excess $H_2S$ from an aqueous phase Claus reactor.

14. A process as claimed in claim 13 wherein absorbent from the last absorbent zone in the plurality of absorbers is passed to an aqueous phase Claus reactor for reaction of the $SO_2$ contained therein with $H_2S$.

15. A process as claimed in claim 14 wherein lean absorbent from the Claus reactor is recycled to the absorbent zone used to treat the most dilute $SO_2$-containing gas stream.

16. A process as claimed in claim 13 wherein each absorber treats a single gas stream.

17. A process as claimed in claim 14 wherein each absorber treats a single gas stream.

18. A process as claimed in claim 15 wherein each absorber treats a single gas stream.

* * * * *

UNITED STATES PATENT AND TRADEMARK OFFICE
CERTIFICATE OF CORRECTION

PATENT NO. : 4,450,145
DATED : May 22, 1984
INVENTOR(S) : John E. Klepeis

It is certified that error appears in the above—identified patent and that said Letters Patent is hereby corrected as shown below:

Col. 3, line 30, "$SO_4$: 57.5" should read -- $SO_4$: 57.6 --.

Signed and Sealed this

Twenty-first Day of August 1984

[SEAL]

Attest:

GERALD J. MOSSINGHOFF

Attesting Officer

Commissioner of Patents and Trademarks